Patented May 9, 1944

2,348,447

UNITED STATES PATENT OFFICE 2,348,447

ADHESIVE AND COATING MATERIAL

Eugen Bock, Krefeld-Uerdingen, Germany; vested in the Alien Property Custodian

No Drawing. Application February 11, 1941, Serial No. 378,411. In Germany February 2, 1940

1 Claim. (Cl. 260—32)

This invention relates to a new composition of matter suitable especially as an adhesive or coating material, furthermore the invention relates to the employment of the new composition of matter for the purpose mentioned before.

The use of solutions of nitrocellulose and of Celluloid as adhesives is known. These adhesives contain considerable amounts of a volatile solvent for nitrocellulose, for instance acetone, methyl acetate, butyl acetate or the like and may contain also non-solvents, such as aromatic or aliphatic hydrocarbons or chlorinated aliphatic hydrocarbons. The quantity of the non-solvent added remains, however, below the dilution number established for each solvent and mixture of solvents, respectively, that is to say, the ratio which exists between non-solvent and solvent when in a nitrocellulose solution, on addition of the non-solvent, the precipitation of the nitrocellulose just begins. The adhesive power is hardly enhanced by the addition of the non-solvent. The latter is rather added to bring about the desired speed of drying and setting and for reasons of economy.

Now, I have found that it is possible to increase to a surprising extent the stability of the agglutinations obtained by means of adhesives built up on the basis of polyvinyl compounds as well as that of the surface coverings obtained by means of coating materials built up on the same basis, by adding to the solution of the polyvinyl compound in an organic solvent such a quantity of a substance being a non-solvent for the polyvinyl compound and compatible with the solvent as is insufficient for precipitating the dissolved polyvinyl compound. Especially when porous substances, such as textiles or leathers are to be glued or to be coated, the products of the present invention are particularly suitable since they do not penetrate into the pores but remain active at the surface.

As polyvinyl compounds there may be mentioned: polyvinyl chloride, polystyrene, polyvinyl ethers, for example polyvinyl ethyl ether, polyvinyl propyl ether, polyvinyl isopropyl ether, polyvinyl isobutyl ether, if desired as interpolymers of these polyvinyl ethers with vinyl ethers of the higher aliphatic, aromatic or alicyclic alcohols with up to 35 carbon atoms, or of mixtures from alcohols, polyvinyl esters, for example, polyvinyl acetate, polyacrylic acid compounds, such as polyacrylic acid nitrile, polyacrylic acid methyl ester, polyacrylic acid ethyl ester, polyacrylic acid amide or polyacrylic acid amides substituted at the nitrogen atom, such as polyacrylic acid-N-ethyl amide, polyacrylic acid-N-diphenyl amide, polymethacrylic acid compounds, such as polymethacrylic acid methyl or polymethacrylic acid ethyl ester, the polymers of crotylidene cyanacetic acid esters, furthermore the caoutchouc like polymerisates of butadiene and isoprene. Instead of the above mentioned polymerisates of the vinyl compounds also interpolymers of these compounds with each other can be used. It may be mentioned that the polyvinyl ethers and interpolymers thereof are especially advantageous as components of the adhesives of this invention.

The substances which are solvents for the above mentioned polyvinyl compounds are known or may easily be ascertained by an expert by a simple test. The organic solvents suitable according to the present invention are given therewith. Also the substances being non-solvents for the above mentioned polyvinyl compounds are known or may easily be ascertained by a simple test. Substances which are solvents for a certain polyvinyl compound may be of course non-solvents for another polyvinyl compound and vice versa.

The expression "non-solvent" is intended to comprise not only such substances as are not at all capable of dissolving the respective polyvinyl comound but also those substances which only bring about a slight dissolution or swelling of the polyvinyl compound.

As solvents and non-solvents, respectively, there may be mentioned, for instance, benzine, acetone, methyl ethyl ketone, furthermore ethanol, methanol, glycol, methyl glycol, ethyl glycol, diethyl ether, dibutyl ether, methyl acetate, ethyl acetate, methylene chloride, nitropropane, but also benzene, toluene, xylene, tetrahydrofurane or the like. Mixtures of these substances may, of course, also be used.

Advantageously such a quantity of the non-solvents is added to the solution of the polyvinyl compound that the precipitation of the polyvinyl compound just does not yet begin. This quantity depends on the kind of the single components of the material to be prepared according to this invention and on the use to which it is to be put and may easily be ascertained by an expert by a simple test. In some cases it may also be advantageous to use smaller quantities of the non-solvent.

The materials obtainable according to the present invention are especially suitable for such purposes as require a solid, flexible and elastic agglutination. There come into consideration the gluing together of porous materials, such as leather, textiles, especially felt, card board, paper or the like. The usual additions, such as dyestuffs, pigments, resins and so on may also be applied.

The following examples illustrate the invention without being restricted thereto; the parts are by weight:

Example 1

20 parts of highly polymeric vinyl isobutyl ether are dissolved in 40 parts of benzine and 40 parts of acetone are added. A composition is obtained which when applied on porous materials, such as leather or textiles, slightly dried and pressed yields very solid agglutinations.

Example 2

To a solution of 20 parts of highly polymeric polyvinyl isobutyl ether in 65 parts of benzine 15 parts of ethanol are added, whereby an adhesive of an action similar to that of example 1 is obtained.

Example 3

16 parts of an interpolymer of 80 parts of butadiene and 20 parts of acrylic nitrile are dissolved in 62 parts of methyl ethyl ketone and 22 parts of ethanol are added. A valuable adhesive is likewise obtained.

I claim:

As a new composition of matter a solution of 20 parts of highly polymeric vinyl isobutyl ether in 40 parts of benzine and 40 parts of acetone.

EUGEN BOCK.